Patented Oct. 29, 1946

2,410,107

UNITED STATES PATENT OFFICE 2,410,107

ALKYLATION PROCESS

Alexander N. Sachanen and Arlie A. O'Kelly, Woodbury, N. J., and Claude G. Myers, Bryn Mawr, Pa., assignors to Socony-Vacuum Oil Company, Incorporated, a corporation of New York No Drawing. Application September 11, 1943, Serial No. 502,018

20 Claims. (Cl. 260—683.4)

This invention relates to the alkylation of paraffinic hydrocarbons with olefinic hydrocarbons and is more particularly concerned with the production of high octane motor fuel by the catalytic alkylation of normally gaseous paraffinic hydrocarbons with normally gaseous olefinic hydrocarbons.

It is well known in the art to polymerize olefinic hydrocarbon gases to produce motor fuels having constituents of an unsaturated character. Various commercial processes have been proposed for ultimately effecting the desired polymerization of the olefinic hydrocarbons. These processes have been predicated upon the dictates of the chemical nature of the stocks available as well as engineering considerations such as initial and operation costs; their essential feature being that in the course of treating the materials, the olefinic hydrocarbons produced in the earlier stages of the process, are eventually polymerized to gasoline. Accordingly, hydrocarbon gases may be passed along with cracking stock or naphtha through a cracking still to crack and polymerize such gases to gasoline simultaneously with the cracking or reforming, or paraffinic hydrocarbon gases may be separately cracked to olefinic hydrocarbon gases and these gases are subsequently passed with naphtha through a polymerizing and reforming still. In some instances, the processes involve the use of catalysts for facilitating the cracking and/or polymerization operations.

It is also well known in the art, to combine paraffinic hydrocarbons directly with olefinic hydrocarbons by processes broadly called alkylation processes, to produce motor fuels having constituents of saturated character. In alkylation processes, a charge comprising a mixture of a paraffinic hydrocarbon, hereinafter called the paraffinic reactant, and an olefinic hydrocarbon, hereinafter called the olefinic reactant, is subjected to high temperature and pressure to produce a saturated alkylate product. Since conditions of alkylation also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by the degradation of the hydrocarbon reactants in the charge to low molecular weight hydrocarbons and the occurrence of side reactions, including polymerization of the olefinic reactant under high temperature conditions that substantially reduce the purity of the product obtained.

Alkylation may be conducted at high temperatures and pressures, on the order of over 900° F. and over 4000 pounds per square inch, gauge, respectively; or may be conducted in the presence of alkylation catalysts at lower temperatures and pressures, thereby assuring a high yield of desired alkylate by avoiding extensive degradation of the reactants, the occurrence of side and secondary reactions, and appreciable polymerization of the olefinic reactant. The two methods are known as thermal alkylation and as catalytic alkylation, respectively.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays and the like, as catalysts. In these catalytic alkylation processes, the hydrocarbon reactants form with the alkylation catalysts, a heterogeneous system, during the alkylation operation. Since under alkylation conditions, the catalytic activity of the alkylation catalysts appears to be predicated upon contact between the catalysts and the gaseous hydrocarbon reactants at the interfaces therebetween, in these processes, the catalysts are used in amounts varying between 10% and 200% by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic action of these alkylation catalysts. Accordingly, several processes have been proposed wherein small amounts of these promoters, on the order of about 1% to 3% by weight on the charge, are added to the catalysts to promote their alkylation catalytic activity. It must be noted, however, that insofar as we are aware, no catalytic alkylation process is known wherein these promoters are used exclusively as catalysts.

We have found that paraffinic hydrocarbons may be efficiently alkylated with olefinic hydrocarbons to produce high yields of high octane gasoline by using promoter amounts of alkylation catalysts that form, with the hydrocarbon reactants, a single homogeneous gaseous phase during the alkylation operation.

It is an object of the present invention to provide an efficient process for catalytically alkylating paraffinic hydrocarbons with olefinic hydrocarbons. Another object of the present invention is to provide an efficient process for catalytically alkylating either normal paraffinic hydrocarbons or isoparaffinic hydrocarbons with olefinic hydrocarbons. A more specific object is to provide a process for catalytically alkylating normally gaseous paraffinic hydrocarbons with normally gaseous olefinic hydrocarbons to produce high yields of high octane gasoline. A very important object of the present invention is to afford a process capable of carrying out the above objects by using an alkylation catalyst which forms with the hydrocarbon reactants, a single homogeneous gaseous phase during the alkylation operation. Other objects and advantages of the present invention will become apparent to those skilled in the art from the following description.

Broadly stated, the present invention provides a process for alkylating paraffinic hydrocarbons with olefinic hydrocarbons which comprises contacting a paraffinic hydrocarbon and an olefinic hydrocarbon in a reaction zone under alkylating conditions, with promoter amounts of an alkylation catalyst consisting essentially of a material that forms with the hydrocarbon reactants, a single, homogeneous gaseous phase under the alkylation conditions of the reaction zone.

An important feature of the present invention is the fact that, contrary to the known catalytic alkylation processes of the prior art which are only capable of alkylating isoparaffinic hydrocarbons, our process is capable of alkylating either normal paraffinic hydrocarbons or isoparaffinic hydrocarbons with substantially equal ease.

Another important feature of our process is the relatively low temperature that may be used. As a result, degradation of the hydrocarbon reactants in the charge to low molecular weight hydrocarbons and the occurrence of side reactions including polymerization of the olefinic reactants, are substantially completely avoided. Consequently, in the process of the present invention, we obtain high yields of a high grade product that is almost entirely paraffinic in nature and is substantially free from impurities. For instance, we have obtained yields of alkylate gasoline in amounts of up to 200% by weight per pass based on the olefinic hydrocarbon content in the charge, and the gasoline had an octane value of 85 C. F. R. motor method.

A most important feature of the present invention is the fact that, contrary to the known catalytic alkylation processes of the prior art, in which the hydrocarbon reactants being processed form with the alkylation catalysts, a heterogeneous system during the alkylation operation, the alkylation process of our invention employs alkylation catalysts consisting essentially of materials that form with the hydrocarbon reactants being processed, a single, homogeneous gaseous phase under alkylating conditions. The alkylation catalysts of the present invention may be called, therefore, homogeneous gaseous phase catalysts in contradistinction to the alkylation catalysts of the prior art, which may be referred to as heterogeneous catalysts. Accordingly, as a result of the catalyst being in the same phase or state as the hydrocarbon reactants being processed, fouling of the catalyst is substantially eliminated, and agitation and/or mixing problems are non-extant. Further, since the catalytic activity of alkylation catalysts appears to be predicated somewhat upon contact between the catalysts and the gaseous hydrocarbon reactants at the interfaces therebetween, it follows that the catalytic efficiency of a given catalyst increases with the increase in area of interfacial contact, other variables remaining constant. Hence, since the homogeneous gaseous phase catalysts of our process inherently furnish the greatest possible "interfacial contact" between the catalyst and the hydrocarbon reactants under the conditions of alkylation, efficient catalytic activity with a concomitant high yield of high grade alkylate is achieved using relatively small amounts of homogeneous gaseous phase catalyst.

In view of the foregoing, an operation feature of the process of the present invention that is of considerable practical importance is that small or promoter amounts of alkylation catalyst are used. In operation, we use catalysts in amounts varying between about 0.5% and about 3%, preferably in amounts varying between about 1% and about 1.25% with respect to the total charge of hydrocarbon reactants. These amounts are so small that the catalyst may be discarded feasibly, thereby obviating recovery and regeneration problems and eliminating high initial and operation costs. It must be noted, however, that larger amounts of catalyst may be employed if desired, although no additional advantages result therefrom.

The homogeneous gaseous phase alkylation catalysts of the present invention may be solids, liquids or gases under normal conditions. However, it is essential for the purposes of the present invention, that the catalyst form with the hydrocarbon reactants being processed, a single, homogeneous gaseous phase under the alkylation conditions of the process. Organic halogen compounds have been found to be very effective catalysts of this type. The organic halogen compound catalysts comprise organic halogen derivatives of hydrocarbons, wherein halogens have been substituted for part or all of the hydrogen of an organic compound. Generally speaking, the preferred catalysts of the present invention are organic halogen derivatives of hydrocarbons, and, particularly, cheap chlorine derivatives, wherein chlorine is substituted onto a non-ring portion, if any, of the hydrocarbon. It is to be understood herein, that by "derivatives" of hydrocarbons, we mean compounds wherein all the hydrogen has been substituted, e. g., carbon tetrachloride, as well as compounds wherein only part of the hydrogen has been substituted, e. g., chloroform; the efficiency of the catalysts apparently being somewhat in proportion to the ease with which they decompose during the alkylation. We especially prefer to use as our catalysts, chlorinated derivatives of light paraffinic hydrocarbons including hydrocarbons of gasoline-boiling range. Thus, at the present time, we consider a chlorinated naphtha or a chlorinated butane as the most feasible homogeneous gaseous phase catalyst from a practical standpoint. However, other specific catalysts that may be mentioned by way of nonlimiting example are: chloroform; carbon tetrachloride; ethyl chloride; ethylene dichloride; trichlor-acetic acid; chloral; acetyl chloride; benzoyl chloride; benzyl chloride; dichlor-propane; dichlor-isobutane; isobutylene dichloride; propylene dichloride; 1,2,3-trichlor-propane; dichloro-difluoro methane; dichloro-monofluoro methane; methyl-chlor acetate; propylene dibromide; dibrom isobutane; ethyl bromide; propylene tribromide; tertiary monobrom butane; and so forth. It is to be understood, of course, that free halogens or hydrogen halides, reacting with hydrocarbons, can be used to form our homogeneous gaseous phase catalysts in situ.

Certain nitro organic compounds, heterocyclic oxygen compounds and elemental halogens as well as certain organic halides containing a nitro-group have been found also to be very effective homogeneous gaseous phase catalysts. Nitromethane, propylene oxide, bromine and chlorine, and 1-chloro 1-nitro-propane may be mentioned by way of non-limiting examples. These types of homogeneous gaseous phase catalysts form the subject matter of separate applications for Letters Patent, namely, Ser. No. 508,062, filed October 28, 1943; Ser. No. 513,720, filed December 10, 1943; Ser. No. 502,812, filed September 17, 1943.

The paraffinic and olefinic hydrocarbons to be used in our process may be derived from any suitable source, as is well known in the art, and may be used either in the pure state or in admixture with other constituents not undesirable. The paraffinic and olefinic hydrocarbons usually employed in the preferred operation of manufacturing motor fuels will be the normally gaseous paraffinic hydrocarbons, except methane and ethane, and the normally gaseous olefinic hydrocarbons, as is well understood in the art. Here again our process has a distinct advantage over many of the prior art processes in that the olefin ethylene may be used for alkylating the paraffinic hydrocarbons. It is well known that ethylene is less reactive in catalytic reactions than some of the higher olefinic hydrocarbons, such as the butylenes. For this reason, ethylene cannot be used in many catalytic processes, including the sulfuric acid process, whereby the supply of available olefinic hydrocarbons is restricted. Therefore, an important aspect of the present invention is the fact that butane, for instance, may be alkylated with ethylene. Thus, by reacting isobutane with ethylene substantial quantities of neohexane are produced. As a matter of fact, we obtain on an average about 45% of neohexane in the alkylate boiling up to 320% F., produced from isobutane and ethylene. The importance of this contribution is obvious.

A conventional and preferred source of paraffinic and olefinic hydrocarbons is the fixed gases obtained around petroleum refineries. These fixed gases may furnish substantially all the desired paraffinic and olefinic hydrocarbons, or it may be necessary or desirable to obtain additional supplies, as is well understood. Additional olefinic hydrocarbons, if required, may be formed from a portion of the paraffinic hydrocarbons. On the other hand, additional paraffinic hydrocarbons may be admixed in order to increase the concentration of paraffinic hydrocarbons to a desired magnitude.

In carrying out our process we use temperatures varying between about 590° F. and about 850° F. or higher, and, preferably, temperatures varying between about 650° F. and about 825° F. The alkylate produced under these conditions contains no more than 5% of olefinic hydrocarbons and no aromatics so that the predominance of alkylation obtained thereby is a distinct feature of the process. Under appreciably higher temperature conditions, side reactions occur that substantially reduce the purity of the product obtained.

The pressure to be used may vary from about 500 pounds per square inch to about 3000 pounds per square inch or more, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

In our process, it is desirable, as in known isoparaffin-olefin alkylation processes, to keep the concentration of the olefinic hydrocarbons relatively low during the alkylation reaction in order to eliminate as much olefin polymerization as possible. Accordingly, it is advisable to maintain the olefin concentration in the charge below about 25% by volume and preferably, between about 7% and about 12% by volume.

The alkylate product that we obtain distills over a fairly large boiling range, but a greater part of the alkylate, usually from about 85% to 90%, distills in the boiling range of aviation gasolines. The iodine number of the aviation distillate is low, on the order of about 5 to 10, when the temperature of the process is moderate, say, up to 650° F. in batch operation, and up to 700° F. to 800° F. in continuous operation. At higher temperatures, the iodine number may increase up to 20 or 50. As has been mentioned hereinabove, the alkylate product consists predominantly of branched paraffins.

To illustrate our invention, we set forth below in Tables I and II, typical data obtained in carrying out our process:

Table I.—Batch operation

|  | Run 1 | Run 2 | Run 3 |
|---|---|---|---|
| Paraffin, parts by weight | Isobutane, 635 | Same as Run 1 | n-Butane, 600 |
| Olefin, parts by weight | Ethylene, 94 | do | Ethylene, 82 |
| Catalyst | None | 1% CHCl₃ | 1% CHCl₃ |
| Temperature, °F | 625 | Same as run 1 | 625 |
| Pressure #/sq. in | 3300 | do | 3000 |
| Reaction time, min | 30 | do | 30 |
| *Product* | | | |
| Gasoline end point, °F | 320 | 320 | 320 |
| Parts by weight | 10 | 120 | 135 |
| Percent by weight of gasoline based on olefin | 10 | 128 | 165 |
| Structure | Appears to be polymerized ethylene | Branched paraffins | Branched paraffins |
| Heavy ends (above 320° F.), parts by weight |  | 14 | 13 |

Table I.—Batch operation (Continued)

|  | Run 4 | Run 5 | Run 6 |
|---|---|---|---|
| Paraffin, parts by weight | Isobutane, 600 | Isobutane, 600 | Isobutane, 600 |
| Olefin, parts by weight | Ethylene, 90 | Propylene, 140 | Ethylene, 125 |
| Catalyst | 0.8% CH₃CH₂Cl | 1% CHCl₃ | Chlornaphtha |
| Temperature, °F | 725 | 750 | 750 |
| Pressure, #/sq. in | 3400 | 3700 | 3700 |
| Reaction time, min | 30 | 30 | 30 |
| *Product* | | | |
| Gasoline end point, °F | 320 | 320 | 320 |
| Parts by weight | 119 | 143 | 164 |
| Percent by weight of gasoline based on olefin | 132 | 102 | 160 |
| Structure | Branched paraffins | Branched paraffins | Branched paraffins |
| Heavy ends (above 320° F.), parts by weight | 19 | 27 | 20 |

Table II.—Continuous operation

|  | Run 7 | Run 8 | Run 9 |
|---|---|---|---|
| Paraffin, per cent by weight. | Isobutane, 88.5. | Same as run 7. | Same as run 7. |
| Olefin, per cent by weight. | Ethylene, 11.5. | ----do---- | Do. |
| Catalyst | 1% CHCl$_3$ | ----do---- | Do. |
| Temperature, °F. | 750 | ----do---- | Do. |
| Pressure, #/sq. in. | 3000 | 2000 | 1000. |
| *Product* | | | |
| Gasoline end point, °F. | 320 | 320 | 320. |
| Per cent by weight of gasoline based on olefin. | 161 | 116 | 56. |
| Structure | Branched paraffins. | Branched paraffins. | Branched paraffins. |
| Sp. gravity | 0.673 | 0.679 | 0.677. |
| Iodine No | 13 | 14 | 18. |
| Octane value, C. F. R. motor method. | 85 | 85 | 85. |
| Heavy ends (above 320° F.), per cent by weight of heavy ends based on olefin. | 13 | 7 | 5. |

It must be noted that run 1 which was made without a catalyst, gave a 10% yield of ethylene polymers. Run 2 which was made under identical conditions, with the exception that 1% of chloroform was used, gave a 128% yield of isoparaffins boiling up to 320° F.

The alkylate produced by our process is contaminated by various halogen compounds which are present in small concentration. These compounds cause a negative susceptibility to tetraethyl lead, and, therefore, should be removed. Removal of these halogen compounds is possible in a variety of ways, as set forth in copending applications Ser. No. 477,450, filed February 27, 1943; Ser. No. 502,504, filed September 15, 1943; and Ser. No. 504,436, filed September 30, 1943.

This application is a continuation-in-part of our co-pending application Ser. No. 403,870, filed July 24, 1941.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. The process of alkylating a paraffinic hydrocarbon with an olefinic hydrocarbon, which comprises contacting a paraffinic hydrocarbon with an olefinic hydrocarbon, in gaseous phase in a reaction zone under alkylating conditions including a temperature varying between about 590° F. and about 850° F. and a pressure in excess of about 500 pounds per square inch, with an alkylation catalyst consisting essentially of a halogenated hydrocarbon selected from the group consisting of chlorine derivatives of acyclic hydrocarbons and bromine derivatives of acyclic hydrocarbons, that forms with said paraffinic hydrocarbon and with said olefinic hydrocarbon, a single, homogeneous gaseous phase under said alkylating conditions, and maintaining the paraffinic hydrocarbon in excess over the olefinic hydrocarbon in said reaction zone so that alkylation is the principal reaction.

2. The process of claim 1 wherein the alkylation catalyst consists essentially of a halogenated hydrocarbon selected from the group consisting of chlorine derivatives of low-boiling acyclic hydrocarbons and bromine derivatives of low-boiling acyclic hydrocarbons.

3. The process of claim 1 wherein the alkylation catalyst consists essentially of a halogenated hydrocarbon selected from the group consisting of chlorine derivatives of low-boiling tertiary acyclic hydrocarbons and bromine derivatives of low-boiling tertiary acyclic hydrocarbons.

4. The process of claim 1 wherein the alkylation catalyst consists essentially of a material selected from the group consisting of chlorinated naphtha and brominated naphtha.

5. The process of claim 1 wherein the alkylation catalyst consists essentially of a material selected from the group consisting of chlorinated butane and brominated butane.

6. The process of manufacturing high octane gasoline, which comprises contacting a normally gaseous paraffinic hydrocarbon with a normally gaseous olefinic hydrocarbon, in gaseous phase in a reaction zone under alkylating conditions including a temperature varying between about 650° F. and about 825° F. and a pressure in excess of about 1500 pounds per square inch, with an alkylation catalyst consisting essentially of a halogenated hydrocarbon selected from the group consisting of chlorine derivatives of acyclic hydrocarbons and bromine derivatives of acyclic hydrocarbons, that forms with said normally gaseous paraffinic hydrocarbon and with said normally gaseous olefinic hydrocarbon, a single, homogeneous gaseous phase under said alkylating conditions, in amounts of at least 0.5% by weight based on the total weight of said normally gaseous paraffinic hydrocarbon and said normally gaseous olefinic hydrocarbon, and maintaining the normally gaseous paraffinic hydrocarbon in excess over the normally gaseous olefinic hydrocarbon in said reaction zone so that alkylation is the principal reaction.

7. The process of claim 6 wherein the alkylation catalyst consists essentially of a halogenated hydrocarbon selected from the group consisting of chlorine derivatives of low-boiling acyclic hydrocarbons and bromine derivatives of low-boiling acyclic hydrocarbons.

8. The process of claim 6 wherein the alkylation catalyst consists essentially of a halogenated hydrocarbon selected from the group consisting of chlorine derivatives of low-boiling tertiary acyclic hydrocarbons and bromine derivatives of low-boiling tertiary acyclic hydrocarbons.

9. The process of claim 6 wherein the alkylation catalyst consists essentially of a material selected from the group consisting of chlorinated naphtha and brominated naphtha.

10. The process of claim 6 wherein the alkylation catalyst consists essentially of a material selected from the group consisting of chlorinated butane and brominated butane.

11. The process of manufacturing high octane gasoline, which comprises contacting isobutane with ethylene, in gaseous phase in a reaction zone under alkylating conditions including a temperature varying between about 590° F. and about 850° F. and a pressure in excess of about 500 pounds per square inch, with an alkylation catalyst consisting essentially of a halogenated hydrocarbon selected from the group consisting of chlorine derivatives of acyclic hydrocarbons and bromine derivatives of acyclic hydrocarbons, that forms with said isobutane and with said ethylene, a single, homogeneous gaseous phase under said alkylating conditions, and maintaining the isobutane in excess over the ethylene in said reaction zone so that alkylation is the principal reaction.

12. The process of claim 11 wherein the alkylation catalyst consists essentially of a halogenated hydrocarbon selected from the group consisting of chlorine derivatives of low-boiling acyclic hydrocarbons and bromine derivatives of low-boiling acyclic hydrocarbons.

13. The process of claim 11 wherein the alkylation catalyst consists essentially of a halogenated hydrocarbon selected from the group consisting of chlorine derivatives of low-boiling tertiary acyclic hydrocarbons and bromine derivatives of low-boiling tertiary acyclic hydrocarbons.

14. The process of claim 11 wherein the alkylation catalyst consists essentially of a material selected from the group consisting of chlorinated naphtha and brominated naphtha.

15. The process of claim 11 wherein the alkylation catalyst consists essentially of a material selected from the group consisting of chlorinated butane and brominated butane.

16. The process of manufacturing neohexane, which comprises contacting isobutane with ethylene, in gaseous phase in a reaction zone under alkylating conditions including a temperature varying between about 650° F. and about 825° F. and a pressure in excess of about 1500 pounds per square inch, with an alkylation catalyst consisting essentially of a halogenated hydrocarbon selected from the group consisting of chlorine derivatives of acyclic hydrocarbons and bromine derivatives of acyclic hydrocarbons, that forms with said isobutane and with said ethylene, a single, homogeneous gaseous phase under said alkylating conditions, in amounts of at least 0.5% by weight based on the total weight of said isobutane and said ethylene, and maintaining the isobutane in excess over the ethylene in said reaction zone so that alkylation is the principal reaction.

17. The process of claim 16 wherein the alkylation catalyst consists essentially of a halogenated hydrocarbon selected from the group consisting of chlorine derivatives of low-boiling acyclic hydrocarbons and bromine derivatives of low-boiling acyclic hydrocarbons.

18. The process of claim 16 wherein the alkylation catalyst consists essentially of a halogenated hydrocarbon selected from the group consisting of chlorine derivatives of low-boiling tertiary acyclic hydrocarbons and bromine derivatives of low-boiling tertiary acyclic hydrocarbons.

19. The process of claim 16 wherein the alkylation catalyst consists essentially of a material selected from the group consisting of chlorinated naphtha and brominated naphtha.

20. The process of claim 16 wherein the alkylation catalyst consists essentially of a material selected from the group consisting of chlorinated butane and brominated butane.

ALEXANDER N. SACHANEN.
ARLIE A. O'KELLY.
CLAUDE G. MYERS.